[19] United States Patent
Ares et al.

[11] 3,778,825
[45] Dec. 11, 1973

[54] ADAPTIVE QUANTIZING AND INTEGRATING DETECTOR FOR PULSE-ECHO SYSTEMS

[75] Inventors: Manuel Ares, Manlius; Lowell W. Bauer, Liverpool, both of N.Y.

[73] Assignee: General Electric Company, Syracuse, N.Y.

[22] Filed: Apr. 10, 1972

[21] Appl. No.: 242,426

[52] U.S. Cl. .................................. 343/7 A
[51] Int. Cl. ................................. G01s 9/06
[58] Field of Search .................. 343/7 A, 7.7, 8, 343/100 CL

[56] References Cited
UNITED STATES PATENTS
3,701,149  10/1972  Patton et al. ................. 343/7 A
3,587,097  6/1971   Stull, Jr. ....................... 343/7 A OTHER PUBLICATIONS
Skolnik, Radar Handbook, McGraw–Hill, 1970, pp. 20–26 to 20–35

Primary Examiner—Benjamin A. Borchelt
Assistant Examiner—G. E. Montone
Attorney—Carl W. Baker et al.

[57] ABSTRACT

This disclosure is of an adaptive quantizing and integrating detector for radar and other pulse-echo systems which provides a continuous estimate of local interference level by averaging the signal level over a time interval including the received signal sample of interest. The estimate of local interference level thus derived adjusts a variable quantizer which typically provides two or more discrete levels of quantization, and the quantizer outputs then are combined in a non-coherent integrator. High detection efficiencies can thus be achieved even in environments where interference levels are unknown or changing.

3 Claims, 2 Drawing Figures

ADAPTIVE QUANTIZING AND INTEGRATING DETECTOR FOR PULSE-ECHO SYSTEMS

BACKGROUND OF THE INVENTION

In pulse-echo systems such as radars and sonars an estimate of the interference level of a received signal is necessary in order to determine within a given degree of assurance whether that signal consists of the interference only or contains also target information or other intelligence signal received along with the interference. The estimate is then used to establish a detection threshold which, when exceeded, indicates that a target should be called. When the actual interference level is not known, it is the common practice in prior art radar and sonar systems to assume a constant interference level and to compare the amplitude of incoming signals with a detection threshold which is set by the operator in accordance with such assumed interference level.

Although some form of automatic gain control can be used to make systems of this type less sensitive to long term changes in interference level, such prior art systems still have the inherent drawback of being sensitive to rapid changes in the interference level. As a result, such systems are likely either to miss target signals because the detection threshold is set too high or to trigger falsely on high level noise signals because the detection threshold is set too low.

Some attempts have been made in the past to provide automatic interference level compensation which is sensitive directly to changing interference levels. These systems often employ a normalizer which adds together several samples of the received signal during selected periods of time. The resultant sum from the normalizer is multiplied by a constant value and compared to the amplitude of a given input sample. If the input sample exceeds the product, the given input sample is considered to be a target signal. Prior art systems of this type provide a simple "greater than" or "less than" conclusion, but they do not indicate the relative values of the resultant sum and the given input sample as would be desirable for fully optimized signal detection when several input samples are to be non-coherently combined.

SUMMARY OF THE INVENTION

It is therefore an object of the present invention to provide a detection system which generates a quantized signal representative of the relative values of a sample input signal and a normalized estimate of current interference which may be time integrated for accurate signal detection.

Further objects and advantages of the invention will be apparent to those skilled in the art from the following description of the invention taken in conjunction with the attached drawings.

In one preferred form, an adaptive quantizing and integrating detector disclosed herein comprises an estimator wherein the level of the received signal is averaged over a selected time interval. The output signal from the estimator is weighted by a set of constant scale factors and the resultant signals are compared in amplitude to a selected sample of the received signal. A digital signal is then generated reflecting the results of the comparisons, with the value of the digital signal thereby representing the selected sample in normalized and quantized form. Digital signals representing input signals from successive transmission periods are summed, and the sum then compared to a fixed threshold. A target is called if the threshold is exceeded.

BRIEF DESCRIPTION OF THE DRAWING

For a fuller understanding of the invention reference is made to the detailed description below when taken with the drawings wherein.

DESCRIPTION OF THE INVENTION

Figure 1:
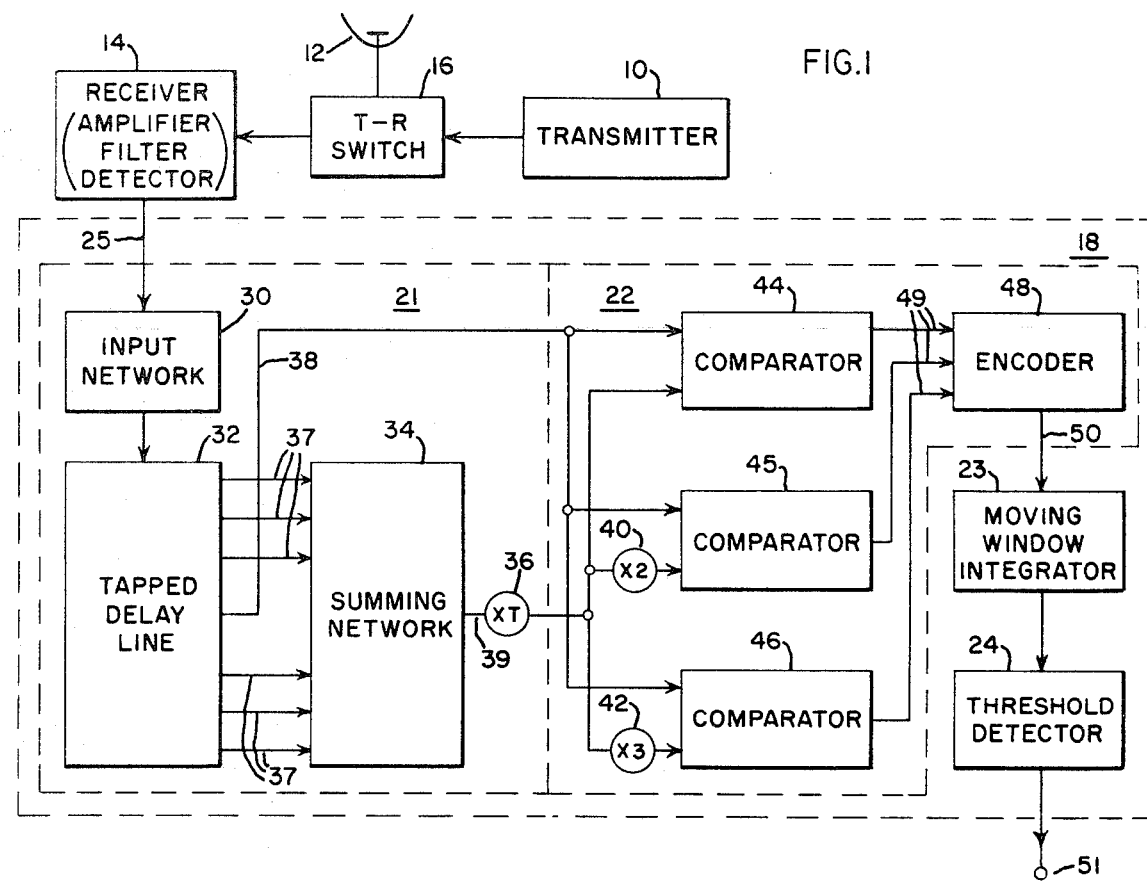
FIG. 1 is a block diagram of an embodiment of the invention.

Referring now to the drawings, FIG. 1 is a block diagram of one embodiment of the present invention illustrated by way of example in a radar system. The system as shown comprises a transmitter 10, an antenna 12, a receiver designated generally by reference numeral 14, and a transmit-receive switch 16 all in the conventional pulse-echo system configuration.

Transmitter 10 delivers a series of pulses at a given carrier frequency and bandwidth to the antenna 12 or other transducer. The transmitted pulses are generated at known intervals and all the pulses have given bandwidth and duration as is well known in the art. The received signals as coupled through T-R switch 16 to the receiver 14 include noise caused by the existing interference sources both external and internal to the system, together with any echo pulse reflected from targets within the radar beam.

Receiver 14 comprises a preprocessor which may include preamplification, conversion, i.f. amplification, filter and detection stages, followed by the adaptive quantizing and integrating detector according to the present invention. This adaptive quantizing and integrating detector, designated generally by reference numeral 18, comprises an interference level estimator 21, variable level quantizer 22, moving window integrator 23 and threshold detector 24, through which signals are processed in the sequence named.

Interference level estimator 21 comprises an input network 30, a tapped delay line 32, a summation network 34 and a multiplier 36, all connected in series relation as shown in FIG. 1.

Signals received over line 25 are first processed by input network 30. In one embodiment, input network 30 may simply comprise a matching network to enable signals on line 25 to be transmitted to tapped delay line 32. This embodiment results in an analogue type operation. In an alternative embodiment, input network 30 may comprise a sampler connected in series with an analogue-to-digital converter. The sampler is operated at a frequency approximately twice the bandwidth of the transmitted pulses. This embodiment results in a digital type operation. Digital operation can also be effected by use of an input network 30 in the form of a shift register for passing digital samples to tapped delay line 32.

In each of these alternative forms which network 30 may take, a signal proportional to the signal on line 25 is applied by the input network to tapped delay line 32. Delay line 32 has a plurality of output taps 37 with one such tap 38 located approximately in the center of the line. The output taps 37 are located to provide a time delay between adjacent taps which is equal to or less than the reciprocal bandwidth of the transmitted pulse.

There is no fixed requirement as to the number of these taps 37.

Output taps 37 are connected to summation network 34 wherein the amplitudes of signals appearing on each of the output taps 37 are added to generate a "sum" signal over line 39. Line 39 connects the output of summation network 34 to a first multiplier 36 which multiplies the sum signal by a constant weighting factor T to generate a first "weighted sum" signal.

With output tap 38 located approximately in the middle of output taps 37, the signal on output tap 38 provides a "sample" of the input signal while the "weighted sum" signal from multiplier 36 provides an adaptive estimate of the amplitude of the input signals received at points in time before and after the sample. It would be possible, therefore, to merely compare the "sample" with the "weighted sum" signal to determine if the "sample" were of great enough amplitude relative to the current interference level to warrant calling the "sample" a target signal. In accordance with the present invention, however, improved detection capability may be achieved by performing this comparison on a multiple weighted basis through variable level quantizer 22.

Quantizer 22 comprises second and third multipliers 40 and 42 respectively; first, second and third comparators 44, 45 and 46 respectively; and encoder 48. Comparators 44, 45 and 46 each have first and second inputs and an output. Delay line tap 38 is connected to the first input of each comparator 44, 45 and 46 for transmitting the "sample" to each comparator. Multiplier 36 is connected to the second input of comparator 44 for communicating the weighted sum thereto. Multiplier 36 is also connected to multipliers 40 and 42. Multiplier 40 is in turn connected to the second input of comparator 45 while multiplier 42 is connected to the second input of comparator 46.

In the embodiment depicted in FIG. 1, multiplier 40 has a multiplying factor of two and multiplier 42 has a multiplying factor of three. Therefore, comparator 44 compares the "sample" directly with the "weighted sum", comparator 45 compares the "sample" with twice the "weighted sum" and comparator 46 compares the "sample" with three times the "weighted sum". Each of the comparators 44, 45 and 46 generates "greater than" or "less than" output signals as a result of the comparisons, which signals are communicated to an encoder 48 over lines 49.

It is important to note that the invention is not limited to the employment of three comparators. More or less comparators may be employed. Additionally, multipliers 40 and 42 need not have factors of two and three respectively. What is necessary is that a plurality of levels of weighting of the "sum" signal be provided to allow a plurality of comparisons with the "sample."

Encoder 48 operates on the output signals from comparators 44, 45 and 46 to generate a signal indicative of the number of comparators which have registered the "sample" as being "greater than" the "weighted sum" signals. The output from encoder 48 is transmitted over line 50 to moving window integrator 23.

Integrator 23 is synchronized with the transmission of pulses by transmitter 15 as is known in the art and thus not shown in detail. Integrator 23 typically might be a "moving window" or an "integrate and dump" device. The integrator 23 operates to integrate or "add up" the digital signals received as a function of time after each pulse transmission, over several such time periods. The integrated value accrued during each of a plurality of time slots after the occurrence of a transmitted pulse is compared to a threshold value in threshold detector 24. When the integrated value in a time slot is greater than the threshold value an appropriate target received signal is sent by threshold detector 24 to output terminal 51.

Figure 2:
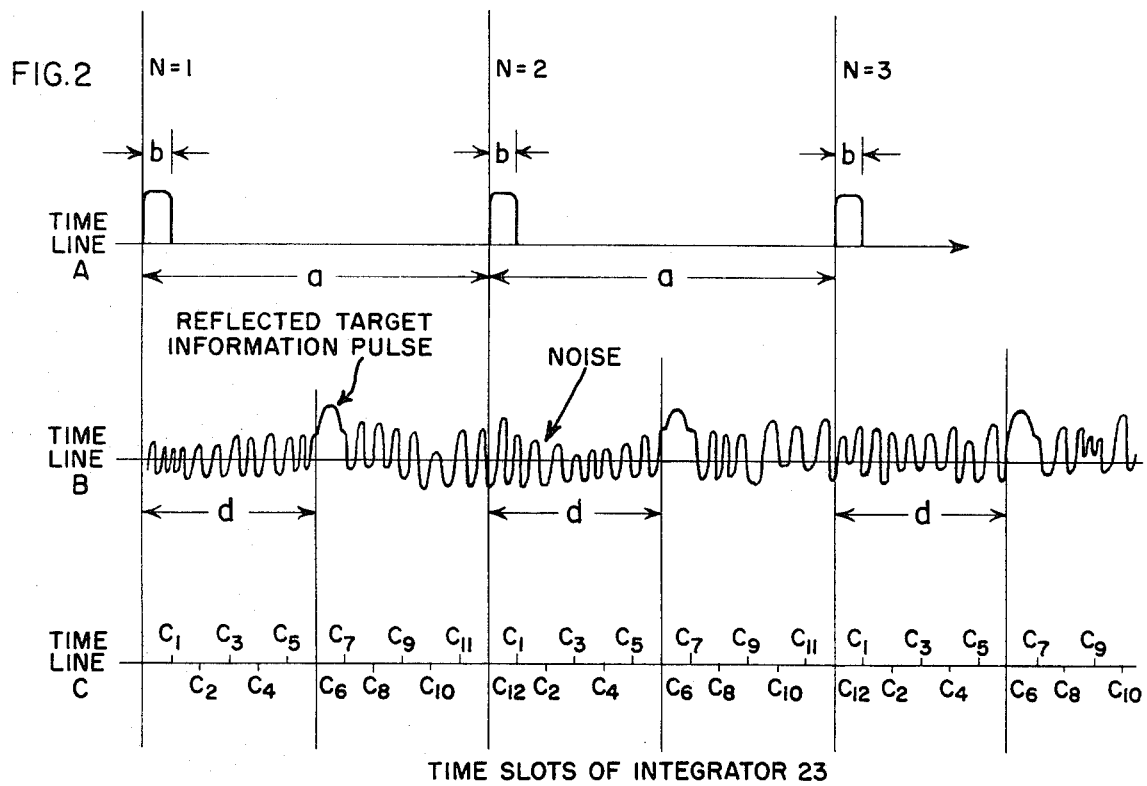
FIG. 2 is a time graph of the embodiment shown in FIG. 1.

Referring now to FIG. 2, a series of transmitter pulses are represented on time line A as being transmitted at recurring time periods N of length "$a$" and each pulse is represented as having a time duration defined by a width "$b$". The signal input to the receiver may be illustratively represented by time line B in FIG. 2 wherein the value of the local interference or noise level is represented as varying over the time period shown, and wherein echo pulses are received a time "$d$" after transmission.

The echo pulse accordingly will appear in the first tap of tapped delay line 32 at a time "$d$" after its transmission. If, for example, tapped delay line 32 had a total of seven taps and tap 38 were the center tap and a signal were delayed a time "$b$" between taps then an additional three time periods "$b$" must pass until the echo pulse becomes the "sample" in tap 38. Therefore, until that time, the echo pulse is added to the "sum" signal on line 39 and none of the comparators 44, 45 and 46 registers a "sample" greater than any of the "weighted sum" signals.

However, at a time three time periods "$b$" after reception of an echo pulse, that pulse arrives at tap 38 and becomes the "sample". At this time some number of the comparators 44, 45 and 46 will register a "sample" greater than "weighted sum" signals to encoder 48, the number thus registered being dependent on the current interference level, on the values chosen for multipliers 36, 40 and 42, and on the amplitude of the echo pulse. Encoder 48 generates a quantized signal to moving window integrator 23 indicating the number of comparators registering a "greater than" signal and the value of the signal is recorded in an appropriate time slot of integrator 23.

The time slots of integrator 23 are represented on time line C of FIG. 2 as $C_1, C_2, C_3$, etc. with each having a width approximately equal to the width "$b$" of the transmitted pulses. At the beginning of each time period N the value of the signal from encoder 48 is added to the first time slot $C_1$. Therefore, by the time the echo pulse appears as the sample at tap 38 of tapped delay line 32, integrator 23 will be at a time slot $C_{10}$ and therein record the appropriate value from encoder 48.

This process is continued until a selected number of N time periods have passed. The sums of the signals in each of the time slots in the moving window integrator 23 are then compared to a threshold value in threshold detector 24. When the value accrued in time slot $C_{10}$ is greater than the threshold value, an appropriate target signal is sent by threshold detector 24 to the output.

It will be understood that various changes may be made in details within the scope of the claims without departing from the spirit of the invention. It is therefore to be understood that the invention is not to be limited to the specific details shown and described.

We claim:

1. An adaptive quantizing and integrating detector comprising:

first means for receiving an input signal;

second means for deriving an estimate of the amplitude of said input signal during selected periods of time;

third means responsive to said signal amplitude estimate for generating first and second signals related thereto by different proportionality factors whereby said second signal has correspondingly different weighting than said first signal;

fourth means for providing a sample of said input signal;

fifth means for comparing the amplitude of said sample with the amplitude of said first signal and for comparing the amplitude of said sample with the amplitude of said second signal to generate a third signal indicating the results of said signal amplitude comparisons;

sixth means for integrating said third signal over a plurality of said periods of time; and seventh means responsive to said integrating means for generating an output signal.

2. The adaptive quantizing and integrating detector claimed in claim 1 wherein:

said second means includes a tapped delay line having a plurality of output taps and a summing network, said plurality of said taps connected to said summing network to generate said first signal;

said third means includes means for providing a plurality of second signals each weighted by increasingly larger values; and said fourth means comprises one of said plurality of output taps.

3. The adaptive quantizing and integrating detector claimed in claim 2 wherein:

said fifth means includes means for comparing said sample with each of said plurality of second signals, said third signal being a first value if said sample is less than said first signal, and said third signal being proportionately larger dependent on the number of said second signals that are smaller than said sample.

* * * * *